United States Patent
Tang et al.

(10) Patent No.: US 6,881,814 B2
(45) Date of Patent: Apr. 19, 2005

(54) BORATE MODIFIED PHENOLIC RESIN FOR INSULATION MATERIAL

(75) Inventors: Kwok Tang, Ontario (CA); Ruben A. Santos, Ontario (CA); Bohumila Zapletal, Ontario (CA)

(73) Assignee: Dynea Canada Ltd., Mississauga (CA)

( * ) Notice: Subject to any disclaimer, the term of this patent is extended or adjusted under 35 U.S.C. 154(b) by 158 days.

(21) Appl. No.: 10/265,250

(22) Filed: Oct. 7, 2002

(65) Prior Publication Data

US 2004/0068083 A1 Apr. 8, 2004

(51) Int. Cl.$^7$ .......................... C08G 14/04; C08G 79/08
(52) U.S. Cl. ...................... 528/129; 528/138; 528/394; 528/488; 528/503
(58) Field of Search ................................. 528/129, 138, 528/488, 503, 394

(56) References Cited

U.S. PATENT DOCUMENTS 6,395,819 B1 * 5/2002 Espiard et al. .............. 524/492

* cited by examiner

Primary Examiner—Duc Truong
(74) Attorney, Agent, or Firm—Birch, Stewart, Kolasch & Birch, LLP

(57) ABSTRACT

Phenolic resins and processes of making these phenolic resins that are useful for making binders for mineral wool insulation products are disclosed. The addition of a boron salt early in the process of making these phenolic resins leads to enhanced properties such as a reduction in the amount of tetradimers and an improvement in the stability of both the base resin and the pre-react.

34 Claims, No Drawings

BORATE MODIFIED PHENOLIC RESIN FOR INSULATION MATERIAL

BACKGROUND OF THE INVENTION

This invention relates to a phenolic resin composition for making a binder for mineral wool insulation products. Typically, phenol formaldehyde resoles (PF) used in binders for wool insulation products have large amounts of free formaldehyde. This is due to the high molar ratio between formaldehyde and phenol typically used for insulation resins. Various techniques have been used to reduce formaldehyde in the resin, such as the use of formaldehyde scavengers. One of these techniques employs using urea. Urea reduces formaldehyde emission, improves the anti-punk property of the binder, and reduces binder cost. However, the addition of urea makes the mixture unstable during storage. Precipitation of higher molecular weight components such as tetradimers and dimethylol urea (DMU) is a problem that results from employing urea. Therefore, this mixture generally must be used within a short period of time. Generally, urea is added to the resin as a 50% solution. It is allowed to react with the formaldehyde for 3–8 hours. The length of reaction time varies depending on the rate of binder usage, and this causes process variations. Long reaction times normally produce precipitation of tetradimers and DMU. This is due to the reduction of free and available formaldehyde as it reacts with urea. Because formaldehyde is a solvent, a reduction of free formaldehyde down to 1% or less will result in the precipitation of tetradimers as well as DMU. Precipitation causes plugged nozzles and blinding of conveyor belts, which will result in downtime and reduced process efficiency.

Several methods have been used in the industry to minimize precipitation of tetradimers and DMUs but these have been of limited use because of various drawbacks. In the present invention, it is discovered that a small amount of sodium tetraborate added during the PF resin cook produces a remarkably stable neat resin and its pre-react.

DESCRIPTION OF RELATED ART

U.S. Pat. No. 6,342,271 B1 discloses a resin composition based on a urea-modified phenol-formaldehyde resole. This resin is an over condensed resole neutralized with boric acid.

U.S. Pat. No. 5,300,562 uses ammonia to extend the stability of the PF urea mixture.

A water-soluble urea-extended phenol-formaldehyde stabilized with an alkanolamine alone or in combination with a monosaccharide or disaccharides is disclosed in U.S. Pat. No. 5,795,934.

These patents have limitations such as a limited storage life or emission potential adding to the volatile organic compounds (VOC) or other emissions during the processing of the binder.

U.S. Pat. No. 5,032,431 discloses the use of a water-soluble borate to improve the moisture resistance after an alkaline cure, yielding dark colored glass fiber insulation.

U.S. Pat. No. 5,290,843 is based on the discovery that the addition of a proper amount a composition containing a water-soluble borate, which also contains an ortho directing catalyst unexpectedly increased water dilutability of phenolic resins at pH 7–8.5. This is for phenolic resin useful for preparing a binder for reinforced composites. This type of product has a less stringent water dilutability requirement; i.e., a ratio of 10:1 instead of a 40:1 ratio for insulation product. There is also no urea extension with this product type. Further, the catalyst used in this reference is ortho directing. Catalysts that are ortho directing are usually bivalent metal cations. These catalysts have to be precipitated with an acid and removed, after which a soluble alkali is used to bring the pH up to the required range. Moreover, in this reference, the molar ratio of formaldehyde to resin tends to also be much lower than the molar ratio of the instant invention. Molar ratios of 1.0–1.8 are typical in U.S. Pat. No. 5,290,843. The molecular weight of the resin is not critical in this reference as long as it is above 1,000. Finally, the solid content is in the range of 60 to 85%.

U.S. Pat. No. 5,004,789 discloses the use of triethanolamine borate to stabilize the PF resin used for prepreg mat binder.

U.S. Pat. No. 4,176,105 discloses the use of boric acid or borates for high temperature binder composition.

BRIEF SUMMARY OF THE INVENTION

The instant invention discloses a phenolic resin composition useful for binders for mineral wool insulation products. Moreover, the instant invention discloses a process of generating this composition.

DETAILED DESCRIPTION OF THE INVENTION

The present invention is based on the discovery that the addition of a small amount of sodium tetraborate during the early stage of the formation of a phenolic resin enhances its properties. The properties that are enhanced are 1) a reduction in the amount of tetradimer and 2) an improvement in the stability of both the base resin and its pre-react. The advantage of a stable pre-react is that it will reduce formaldehyde emissions during transfer and storage from the manufacturing site to the user's site. Further, because the variability of the resultant pre-react is reduced, the pre-react can have longer storage times, which allows urea and formaldehyde to properly react, thus reducing the potential emission from free formaldehyde and the decomposition of lower molecular weight urea compounds. Unreacted urea and related compounds are common sources of particulate emission. Lowering these components will reduce this particulate emission.

In particular, the instant invention relates to a process of making an alkaline phenol formaldehyde resin composition comprising the steps of:
a) charging a reaction vessel with formaldehyde and phenol
b) adding a boron salt to the reaction vessel containing the formaldehyde and phenol
c) heating the reaction vessel
d) adding a base so as to generate the alkaline phenol formaldehyde resin.

Alternatively, the process comprises the steps of
a) charging a reaction vessel with formaldehyde and phenol
b) adding a base to the reaction vessel containing the formaldehyde and the phenol
c) adding a boron salt to the reaction vessel containing the formaldehyde and the phenol and the base
d) heating the reaction vessel to generate the alkaline phenol formaldehyde resin.

In other embodiments of the invention, the alkaline phenol formaldehyde resin composition made by the above listed processes are also within the scope of the instant invention. It is understood that any of the above listed processes and/or compositions can be modified in many ways including some of the illustrative following ways.

The boron salt of the invention is preferably selected from amongst sodium, potassium, lithium, ammonium, magnesium, calcium, or beryllium boron salts or any combination of these salts (e.g. magnesium calcium boron salts), with the boron salts more preferably selected form amongst ammonium, lithium, potassium, or sodium boron salts, and even more preferably selected from amongst ammonium, lithium, potassium, or sodium borate salts, and most preferably selected from sodium tetraborate salts.

It is possible to form the necessary boron salt in situ by reacting boric acid ($H_3BO_3$) or borax ($Na_2B_4O_7 \cdot 10H_2O$) with an alkali metal hydroxide such as sodium hydroxide (or any of the other corresponding alkali metal hydroxides). Neutralizing each mol of boric acid requires one mol of alkali metal hydroxide, while neutralizing each mol of borax requires two mols of hydroxide to form the metaborate salts. It must be remembered that the hydroxide needed to neutralize the borate source is in addition to that needed to maintain alkaline conditions in the phenolic resole resin composition.

The invention may additionally contain a catalyst. Catalysts are not limited to but may include alkaline or acidic catalysts. If an alkaline catalyst is used, the catalyst may be either organic or inorganic.

An alkaline reaction condition can be established by adding an alkaline catalyst to an aqueous solution of the phenol and formaldehyde reactants. During the initial reaction of the phenol and formaldehyde, only that amount of alkaline catalyst necessary to produce a resole resin need be added to the reaction mixture. Suitable amounts of an alkaline catalyst are known to those skilled in the art. Typically, at least about 0.05 mol of alkaline catalyst per mol of phenol is used, with an amount between about 0.1 and 0.3 mol per mol being more usual. Normally, the catalyst is added incrementally to the reaction mixture in two or more portions, although the complete amount can be added when initiating the reaction.

Several types of alkaline catalysts can be used for preparing phenolic resole resins in accordance with the present invention. Typical alkaline catalysts include alkali metal hydroxides such as lithium hydroxide, sodium hydroxide and potassium hydroxide; alkali metal carbonates such as sodium carbonate and potassium carbonate; and tertiary amines, and ammonia. Based on considerations of cost and availability, sodium hydroxide and potassium hydroxide, used together or separately, are preferred catalysts with sodium hydroxide alone being used most often. The instant invention does not need to employ an ortho directing catalyst and also does not need to have further processing done and thus advantageously can be one of the simple catalysts listed above. Preferentially the instant invention uses a non-ortho directing catalyst. Said non-ortho-directing catalyst can be added during any step of the reaction but preferably occurs after the addition of phenol and formaldehyde to the reaction vessel, although it can be added at any time.

Preferably the molar ratio of formaldehyde to phenol is between about 1.1 to about 5.0. and more preferably 2.0 to about 5.0 mols of formaldehyde per mol of phenol, most preferably 2.0 to 4.0 mols of formaldehyde per mol of phenol is used.

Preferably the boron salt molar ratio to the phenol molar ratio is between about 0.01 to about 0.5 and most preferably 0.01 to 0.3 mols to boron salt per mol of phenol is used.

The alkaline phenol formaldehyde resin has a pH of between from about 7.0 to 13.0, more preferably from about 7.0 to about 11.0 and most preferably from about 8.0 to 10.0.

The properties desired of binder compositions depend to a large extent on the properties of the basic resin. A good binder composition should above all be easily applied and capable of covering and/or bonding the reinforcing components, e.g. fibers and honeycombs, and at the same time it should cause little pollution. Further, the resin should have good long-term stability and a high degree of dilutability with water. Since the concept of dilutability is particularly important, it will be defined for the purposes of the present invention as follows: The water dilutability of a resin solution is the volume of de-ionized water which can be added at a given temperature to one unit volume of this solution without producing any permanent perturbation, i.e., haze, clouding or precipitation.

Although the composition of the invention is defined in terms of formaldehyde and the use of formaldehyde is preferred, it is well known in the art that other aldehydes such as acetaldehyde, glyoxal, propionic aldehyde, butylaldehyde and furfural can be substituted for formaldehyde in phenol-formaldehyde resole resins. The use of other aldehydes is, therefore, contemplated for use in preparing compositions of the present invention.

The phenols suitable for use in the invention are phenol per se or substituted phenols or mixtures thereof. Preferably the mixtures contain phenol. Suitable phenols can be represented by the formula I

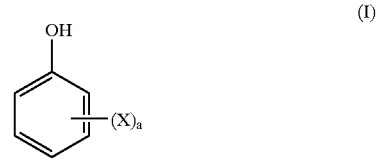

where X is a monovalent radical such as an alkyl, cycloalkyl, aryl, alkaryl, aralkyl, alkoxy, halogen and the like and a is from 0 to 3. Examples of suitable substituted phenols are cresol, isopropylphenols, nonylphenols or dihydric phenols, such as bis-phenol F, hydroquinone and resorcinol. Use of substituted phenols will tend to alter the properties of any resulting phenolic resin which is derived from the resulting product, such property changes being of the kind which allows for a maximum variety of phenolic resin product types. For example, a halogen substitution should enhance the flame retardancy of the resultant phenolic resin.

The free phenol in the instant composition is usually below 3%, more preferably below 1% and most preferably below 0.2%. The free formaldehyde in the composition of the instant invention is generally in the range of 6–20%, more preferably in the range of 8–18% and most preferably in the range of 10–14%.

Other conventional additives compatible with the resole resin composition may be added. Such additives include formaldehyde scavengers, such as urea and ammonia.

The composition of this invention may comprise a variety of liquid forms, including solutions, miscible liquids, or dispersions and the like and combinations of such liquid forms depending upon the optional ingredients blended into the composition. Where the term solution or any of the variations thereof is used herein it is intended to include any relatively stable liquid phase.

Molecular weight of the resin tends to be small so that the resin will maintain good solubility. Typically the main components of the instant invention are dimers, and methylolated phenols (i.e., one and two ring compounds).

The solid content of the instant invention is usually in the range of 40–60%, more preferably 44–55 and most preferably from 45–48%. The solid can be diluted with a solvent, preferably water, although other solvents are within the scope of the invention, including but not limited to one or more of the following solvents: polar and non-polar solvents including but not limited to alcohols, thiols, ketones, aldehydes, carboxylic acids, sulfoxyl and sulfonyl solvents, ethers, alkyl halides, aromatic solvents (including heterocycles), non-aromatic heterocycles, hydrocarbons (including both cyclic and aliphatic hydrocarbons), epoxides, sulfides, and amines. The preferential dilution amount is from 10–20% (solid to water) with a preferred range of 11–17% and a most preferred range of 12–15%.

The viscosity at 25° C. of the resulting composition of the instant invention is preferably less than 200 cps (centipoise), more preferably less than 100 cps, and most preferably less than 50 cps.

Reaction times and temperatures can be monitored so that the reactions go to completion. Typical reaction times are given below in the examples but these examples are in no way meant to limit the scope of the invention.

EXAMPLE #1
Molar Ratio=2.5

| Ingredients | % Active | Quantity |
|---|---|---|
| Phenol | 100 | 807.42 |
| Formaldehyde | 50 | 1288.60 |
| NaOH #1 | 50 | 31.73 |
| NaOH #2 | 50 | 29.08 |
| NaOH #3 | 50 | 26.44 |
| Sodium Borate | 100 | 52.88 |
| Formic Acid | 85 | 52.88 |
| Water #2 | | 210.98 |
| Urea | 100 | 0.00 |
| Total | | 2500.00 |

Procedure:
1) Charge Phenol and Formaldehyde. Adjust temperature so that it is 30–35° C.
2) Charge sodium borate over 10 minutes.
2A) Charge 50% NaOH#1. Charge time is 10 minutes. Allow batch to exotherm to 45° C. so that temperature is controlled at 50° C.
3) React at 50° C. for 60 minutes.
4) After 60 minutes reaction at 50° C., charge 50% NaOH#2. Maintain cooling during addition. Charge time is 10 minutes. Allow batch to exotherm to 52° C. Use cooling as necessary to hold temperature at 52° C.
5) After 60 minute reaction at 52° C. charge 50% NaOH #3. Allow batch to exotherm to 60° C. Apply cooling as needed to hold temperature at 60° C.
6) Two hours after reaching 60° C., start taking Free Phenol samples every 20 minutes Plot % Free Phenol versus time.
7) When the extrapolated % Free Phenol reaches 0.9–0.92%, apply full cooling.
8) At 30° C. divide batch into two portions and keep one at natural pH.
9) For the other sample adjust pH to 7.5 by charging 85% formic Acid.
If above 7.5 add more formic until desired pH is reached.
10) Add water.

A pre-react was made using 95/5 (PF/Urea) ratio based on solids, and it showed much better stability than the control. The stability of a pre-react is evaluated in 2 ways: one by water dilutability (WD) when kept at 25° C. and the other by the amount of precipitation of tetradimer and urea compounds when stored at 9° C.

Product of example 1 showed infinite WD even after 30 days at both pH 7.5 and pH 9.3 whereas the control resin lost WD after 4 days.

For precipitation, it did not show any after 30 days while the control was only good for 5 days.

EXAMPLE #2
Molar Ratio=3.7

| Ingredients | % Active. | Quantity |
|---|---|---|
| Phenol | 100.00% | 921.00 |
| Formaldehyde | 56.00% | 1943.70 |
| Water | 100.00% | 34.00 |
| NaOH | 50.00% | 74.40 |
| Sodium Borate | 100.00% | 27.0 |
| Total | | 3000.00 |

Procedure:
1) Charge the phenol with water in a reaction vessel. Adjust temperature to 50–52° C.
Charge NaOH. Charge time should be 20 minutes.
Maintain temperature at 50–52° C.
2) Charge Sodium Tetraborate.
3) Meter formaldehyde over a 90-minute period. Maintain temperature at 52–55° C.
4) Raise temperature to 55° C.+−1° C. and hold for 30 minutes.
5) After 30-min. reaction at 55° C., allow the batch temperature to rise to 65° C.
6) Two hours after temperature reaches 65° C., start taking free Phenol sample every 20 minutes. Measure and record % FP
Plot % FP Versus Time
7) When the extrapolated % FP reaches 0.2% apply full cooling.
Record pH, RI.

A pre-react was made using 60/40 PF/Urea ratio based on solids, and this pre-react had very good stability. The sample at pH 9.3 had infinite WD up to 30 days. The control was good for less than 20 days under similar conditions.
Similarly, products of Example 2 showed no precipitation after 30 days at 9° C.

EXAMPLE #3
Molar Ratio=4.16

| Ingredients | % Active | Quantity |
|---|---|---|
| Phenol | 100 | 338.68 |
| Formaldehyde | 52 | 865.30 |
| Water #1 | | 12.44 |
| Na$_2$B$_4$O$_7$ | 100 | 9.95 |
| NaOH | 50 | 27.36 |
| Urea | 100 | 373.13 |
| Water #2 | | 373.13 |
| | | 2000 |

Procedure:
1) Charge phenol, water. Adjust temperature to 50–52° C.
2) Charge NaOH over a 20-minute period.
2A) Charge Na2B4O7. Charge time 5 minutes. Maintain temperature at 50–52° C.
3) Meter formaldehyde over a 90-minute period. Maintain temperature at 52–55° C.
4) Maintain temperature at 55° C. for 30 minutes.
5) Alter 30-minutes reaction at 55° C., allow the batch temperature to rise to 65° C.

6) Two hours after temperature reaches 65° C. start taking Free Phenol sample every 20 minutes. Measure and record % FP. Plot % FP versus time.
7) When the extrapolated % FP reaches 0.2% apply full cooling.

The product of Example 3 displayed excellent stability. Samples of pH 7.6 and 8.8 had infinite WD even after 30 days while the control was only good for 4 days. These samples did not show precipitation up to 30 days at 9° C.

Control Experiments

The control resins for the Examples were prepared in the same way as in each example, except that no borate salt was used.

The below table shows a comparison between the control (no borate salt) and the Examples of the instant invention (with a borate salt):

| Resin | Tetradimer stability @ 9° C. Days free of precipitation | Water dilutability (W.D.) @ 25° C. Days with infinite W.D. |
|---|---|---|
| Control of example 1 | 5 | 4 |
| Example 1 @ pH 7.5 | >30 | 25 |
| Example 1 @ pH 9.3 | >30 | >30 |
| Control of example 2 | 5 | <20 |
| Example 2 @ pH 9.1 | >30 | >30 |
| Control of example 3 | 4 | 4 |
| Example 3 @ pH 7.6 | >24 | >30 |
| Example 3 @ pH 8.8 | >24 | >30 |

Test for Tetradimer Stability

All samples are pre-reacted with 50% urea solution at given ratios, e.g. the Resin/Urea ratio is 60/40, 90/10, respectively. The samples are seeded with tetradimer crystals and the formation of the tetradimer build-up is measured in millimeters.

All samples are kept at 9° C.

Illustration of Detailed Data

The following Table illustrates the tetradimer stability of example # 3 at a resin to urea loading of 90/10 and 60/40, respectively.

| | Days (mm of precipitation) | | | | |
|---|---|---|---|---|---|
| Control | 0 | 4<br>0.5 mm of tetradimer | 14<br>10 mm of tetradimer | 17<br>10 mm of tetradimer | 24<br>15 mm of tetradimer |
| 60-458 90/10 8.75 | 0 | 0 | 0 | 0 | 0 |
| 60-458 60/40 8.75 | 0 | 0 | 0 | 0 | 0 |
| 60-458 90/10 7.64 (H$_2$SO$_4$) | 0 | 0 | 0 | 0 | 0 |
| 60-458 60/40 7.64 (H$_2$SO$_4$) | 0 | 0 | 0 | 0 | 0 |
| 60-458 60/40 8.25 (Sulfamic acid) | 0 | 0 | 0 | 0 | 0 |

The water dilutability of example #3 at a resin to urea loading of 90/10 and 60/40, respectively is given in the table below.

| | Days % W.D. | | | | |
|---|---|---|---|---|---|
| | 0 | 4 | 14 | 17 | 24 |
| Control | 4000 | 4000 | 1600 | 1000 | |
| 60-458 90/10 8.75 | 4000 | 4000 | 4000 | 4000 | 4000 |
| 60-458 60/40 8.75 | 4000 | 4000 | 4000 | 4000 | 4000 |
| 60-458 60/40 8.25 (Sulfamic acid) | 4000 | 4000 | 4000 | 4000 | 4000 |

We claim:

1. A process of making an alkaline phenol formaldehyde resin composition comprising the steps of
   a) charging a reaction vessel with formaldehyde and phenol
   b) adding a boron salt to the reaction vessel containing the formaldehyde and phenol to generate a reaction mix
   c) adding a catalyst to the reaction mix
   d) heating the reaction vessel
   e) adding a base so as to generate the alkaline phenol formaldehyde resin.

2. A process of making an alkaline phenol formaldehyde resin composition comprising the steps of
   a) charging a reaction vessel with formaldehyde and phenol
   b) adding a catalyst to the reaction vessel containing the formaldehyde and the phenol
   c) adding a boron salt to the reaction vessel containing the formaldehyde and the phenol and the catalyst
   d) heating the reaction vessel to generate the alkaline phenol formaldehyde resin.

3. An alkaline phenol formaldehyde resin composition made by
   a) charging a reaction vessel with formaldehyde and phenol
   b) adding a boron salt to the reaction vessel containing the formaldehyde and phenol to generate a reaction mix
   c) adding a catalyst to the reaction mix
   d) heating the reaction vessel
   e) adding a base so as to generate the alkaline phenol formaldehyde resin.

4. An alkaline phenolic resin composition made by
   a) charging a reaction vessel with formaldehyde and phenol
   b) adding a catalyst to the reaction vessel containing the formaldehyde and the phenol
   c) adding a boron salt to the reaction vessel containing the formaldehyde and the phenol and the catalyst
   d) heating the reaction vessel to generate the alkaline phenol formaldehyde resin.

5. The process according to claim 1, wherein the boron salt is selected from the group consisting of ammonium, lithium, potassium and sodium boron salts.

6. The alkaline phenol formaldehyde resin according to claim 3, wherein the boron salt is selected from the group consisting of ammonium, lithium, potassium and sodium boron salts.

7. The alkaline phenol formaldehyde resin according to claim 4, wherein the boron salt is selected from the group consisting of ammonium, lithium, potassium and sodium boron salts.

8. The process according to claim 1, wherein the boron salt is selected from the group consisting of ammonium, lithium, potassium and sodium boron salts.

9. The process according to claim 1, wherein the boron salt is sodium tetraborate.

10. The process according to claim 2 wherein the boron salt is sodium tetraborate.

11. The alkaline phenol formaldehyde resin according to claim 3, wherein the boron salt is sodium tetraborate.

12. The alkaline phenol formaldehyde resin according to claim 4, wherein the boron salt is sodium tetraborate.

13. The process according to claim 1, wherein the catalyst is a non-ortho directing catalyst.

14. The process according to claim 2, wherein the catalyst is a non-ortho directing catalyst.

15. The alkaline phenol formaldehyde resin according to claim 3, wherein the catalyst is a non-ortho directing catalyst.

16. The alkaline phenol formaldehyde resin according to claim 4, wherein the catalyst is a non-ortho directing catalyst.

17. The process according to claim 13, wherein the non-ortho directing catalyst is an organic base.

18. The process according to claim 13, wherein the non-ortho directing catalyst is an inorganic base.

19. The process according to claim 1, wherein a molar ratio of formaldehyde to phenol is between about 2.0 to about 5.0.

20. The process according to claim 2, wherein a molar ratio of formaldehyde to phenol is between about 2.0 to about 5.0.

21. The alkaline phenol formaldehyde resin according to claim 3, wherein a molar ratio of formaldehyde to phenol is between about 2.0 to about 5.0.

22. The alkaline phenol formaldehyde resin according to claim 4, wherein a molar ratio of formaldehyde to phenol is between about 2.0 to about 5.0.

23. The process according to claim 1, wherein a molar ratio of boron salt to phenol is between about 0.01 to about 0.30.

24. The process according to claim 1, wherein a molar ratio of boron salt to phenol is between about 0.01 to about 0.30.

25. The alkaline phenol formaldehyde resin according to claim 3, wherein a molar ratio of boron salt to phenol is between about 0.01 to about 0.30.

26. The alkaline phenol formaldehyde resin according to claim 4, wherein a molar ratio of boron salt to phenol is between about 0.01 to about 0.30.

27. The process according to claim 1, wherein the alkaline phenol formaldehyde resin has a pH of between from about 7.0 to 11.0.

28. The process according to claim 2, wherein the alkaline phenol formaldehyde resin has a pH of between from about 7.0 to 11.0.

29. The alkaline phenol formaldehyde resin according to claim 3, wherein the alkaline phenol formaldehyde resin has a pH of between from about 7.0 to 11.0.

30. The alkaline phenol formaldehyde resin according to claim 4, wherein the alkaline phenol formaldehyde resin has a pH of between from about 7.0 to 11.0.

31. The process according to claim 1, further comprising adding urea as a formaldehyde scavenger.

32. The process according to claim 2, further comprising adding urea as a formaldehyde scavenger.

33. The alkaline phenol formaldehyde resin according to claim 3, further comprising adding urea as a formaldehyde scavenger.

34. The alkaline phenol formaldehyde resin according to claim 4, further comprising adding urea as a formaldehyde scavenger.

* * * * *